March 21, 1944. G. D. ADAMS 2,344,485
MILK BOTTLE
Filed July 13, 1943 2 Sheets-Sheet 1
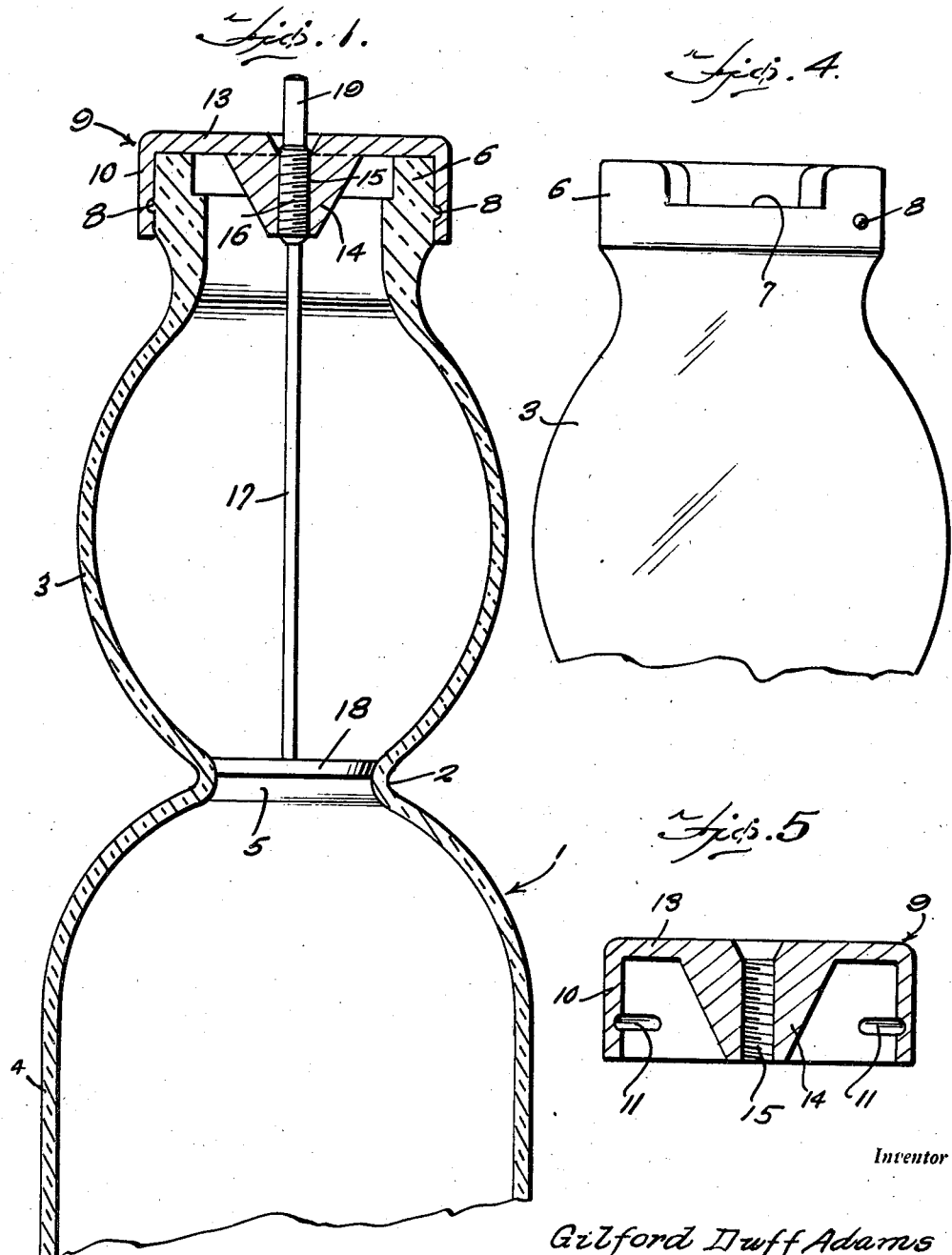
Inventor
Gilford Duff Adams
By Clarence A. O'Brien
and Harvey B. Jacobson
Attorneys March 21, 1944.　　　　G. D. ADAMS　　　　2,344,485
MILK BOTTLE
Filed July 13, 1943　　　2 Sheets-Sheet 2
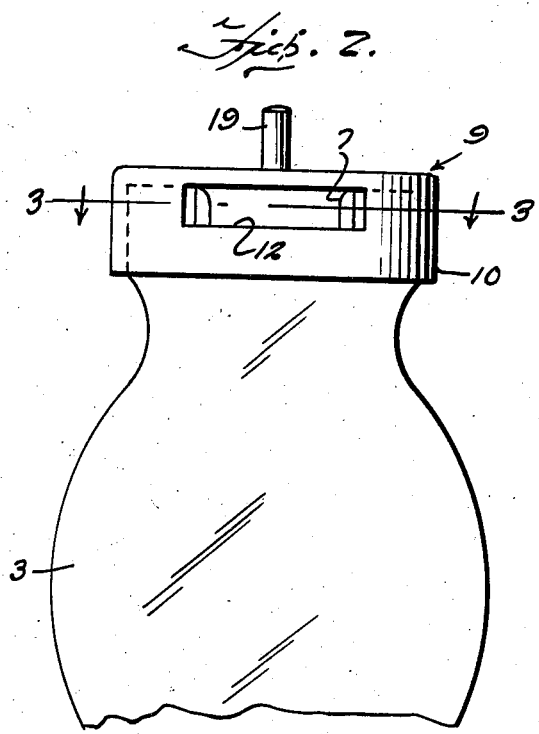
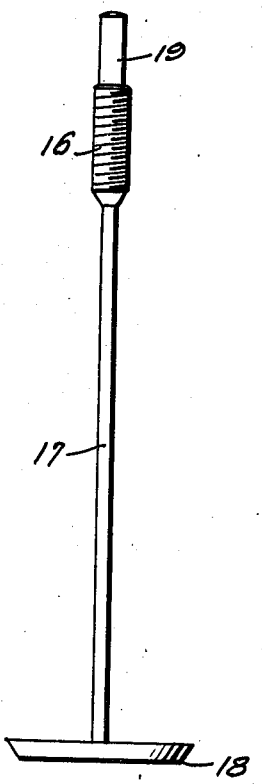
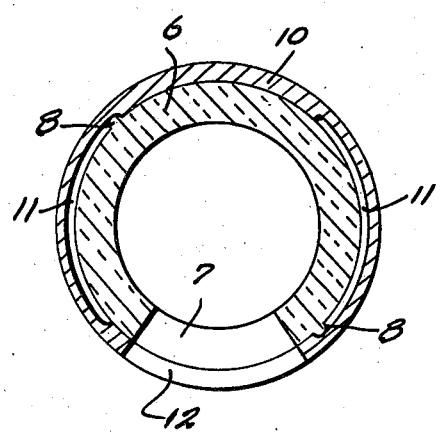
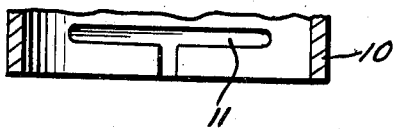
Inventor
Gilford Huff Adams
By Clarence A. O'Brien
and Harvey B. Jacobson
Attorneys Patented Mar. 21, 1944

2,344,485

UNITED STATES PATENT OFFICE 2,344,485

MILK BOTTLE

Gilford Duff Adams, Butterfield, Mo., assignor of nine-sixteenths to F. P. Sizer, Monett, Mo.

Application July 13, 1943, Serial No. 494,513

2 Claims. (Cl. 210—51.5)

The present invention relates to new and useful improvements in milk bottles, and has for its primary object to provide, in a manner as hereinafter set forth, a container of this character comprising unique means for trapping or separating and pouring off the cream.

Another very important object of the invention is to provide a milk bottle of the aforementioned character having a closure of novel construction.

Other objects of the invention are to provide a milk bottle of the character described which will be comparatively simple in construction, strong, durable, attractive in appearance, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in vertical section through a milk bottle embodying the present invention, the lower portion of said bottle being broken away.

Figure 2 is a view in front elevation of the upper portion of the bottle.

Figure 3 is a view in horizontal section, taken substantially on the line 3—3 of Figure 2.

Figure 4 is a view in front elevation of the upper portion of the bottle with the closure removed.

Figure 5 is a view in vertical section through the closure.

Figure 6 is a detail view in elevation of the valve.

Figure 7 is a fragmentary view in vertical section through the lower portion of the closure, taken at right angles to Figure 5.

Referring now to the drawings in detail, it will be seen that the embodiment of the invention which has been illustrated comprises a bottle of suitable material which is designated generally by reference numeral 1. The bottle 1 may also be of any desired capacity. The bottle 1 includes a restricted intermediate portion 2 providing communicating upper and lower cream and milk chambers 3 and 4, respectively. The restriction 2 is formed to provide a seat 5.

The upper portion of the bottle 1 is formed to provide a mouth 6 having formed therein a circumferentially elongated pouring recess 7. Integral lugs 8 project from diametrically opposite sides of the mouth portion 6 of the bottle 1.

A cap 9 of suitable material is mounted on the mouth portion 6 of the bottle 1. The skirt 10 of the cap 9 has formed therein double-ended diametrically opposite bayonet grooves 11 which receive the lugs 8 for rotatably and removably securing said cap in position on the bottle. The skirt 10 of the cap 9 is further provided with a circumferentially elongated pouring opening 12 for alignment with the recess 7. Formed integrally with the top 13 of the cap 9 and depending therefrom is a centrally located cone 14. The cone 14 has formed therein a threaded bore 15.

The bore 15 of the cap 9 threadedly receives an enlargement 16 on a stem 17 which extends downwardly into the cream chamber 3 from the cap 9. A valve member 18 on the lower end of the stem 17 is engageable with the seat 5 for closing the milk chamber 4. Rising from the threaded enlargement 16 is a shank 19 providing a handle for rotating the stem 17.

It is thought that the manner in which the device is used will be readily apparent from a consideration of the foregoing. Briefly, the bottle 1 is filled and the cap 9 is mounted thereon and turned in a direction to close the pouring recess 7. The stem 17 is rotated in a direction to raise the valve 18 from the seat 5 for permitting the cream to flow upwardly into the chamber 3. When it is desired to pour the cream off, the stem 17 is screwed downwardly in the cap 9 for engaging the valve 18 with the seat 5, thereby closing the milk chamber 4. The cap 9 is then rotated to align the opening 12 with the recess 7, after which the cream may be readily poured from the chamber 3. Of course, when it is desired to pour the milk from the chamber 4, the valve 18 is raised to open position. The lugs 8 limit rotation of the cap 9 in opposite directions.

It is believed that the many advantages of a milk bottle constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A milk bottle of the character described comprising a restricted intermediate portion providing communicating upper and lower cream and milk chambers, respectively, a closure cap mounted on the bottle, a manually operable stem threadedly mounted in said closure cap and depending therefrom, and a valve on the lower end of the stem engageable with the restricted portion of the bottle for closing the milk chamber.

2. A milk bottle of the character described comprising a restricted intermediate portion providing communicating upper and lower chambers, a mouth on the upper chamber having a pouring recess therein, a closure cap rotatably mounted on the mouth and including a skirt having an opening therein for registry with the recess, said skirt further having circumferential grooves therein, lugs projecting from the mouth and engaged in the grooves for rotatably and removably securing the cap on the mouth, a stem threadedly mounted in the cap and depending therefrom into the upper chamber, a valve on the lower end of the stem engageable with the restricted portion of the bottle for closing the lower chamber, and an operating member on the upper end of the stem rising above the cap.

GILFORD DUFF ADAMS.